UNITED STATES PATENT OFFICE.

LEO H. BAEKELAND, OF YONKERS, NEW YORK.

METHOD OF MOLDING ARTICLES.

939,966.  Specification of Letters Patent.  Patented Nov. 16, 1909.

No Drawing.  Application filed January 28, 1909.  Serial No. 474,869.

*To all whom it may concern:*

Be it known that I, LEO H. BAEKELAND, a citizen of the United States, residing at Yonkers, in the county of Westchester and State of New York, have invented certain new and useful Improvements in Methods of Molding Articles, of which the following is a specification.

In my prior U. S. applications, Ser. Nos. 383,684, filed July 13, 1907, 397,560, filed October 15, 1907, and 405,021, filed December 4, 1907, I have described several methods of obtaining infusible and insoluble condensation products of phenols and formaldehyde.

The present invention relates to a simple method for the production of molded articles consisting wholly or in part of this product.

If a mixture of phenol or its homologues and formaldehyde or polymers be heated, alone or in presence of catalytic or condensing agents, the formaldehyde and the phenol being present in about molecular proportions, or better, approximately equal volumes of commercial phenol or cresol and commercial formaldehyde, these bodies react upon each other and yield a product consisting of two liquids which will separate or stratify on standing. The supernatant liquid is an aqueous solution which contains the water resulting from the reaction or added with the reagents, whereas the heavier liquid is oily or viscous in character and contains the initial products of chemical condensation. The liquids are readily separated, and the aqueous solution may be rejected, or the water may be eliminated by evaporation. The oily or viscous liquid obtained as above described is found to be soluble in or miscible with alcohol, acetone, phenol, and other solvents, but is only partially and imperfectly soluble in benzol. This product may assume a pasty or semi-solid state when cooled, or may even assume a solid or brittle state, but is again liquefied when heated, and this alternate solidification and liquefaction may be repeated so long as the product does not become transformed into the intermediate or into the final condensation products hereinafter described. This product will be hereinafter referred to as the "initial condensation product."

If the initial condensation product be heated in an open vessel at temperatures above 100° C., the mass will foam, emit vapors, and yield a hard, irregular and porous body, infusible by further heating and insoluble in alcohol, acetone and phenol. In order to avoid the production of a porous mass it has been proposed to harden the initial condensation product at temperatures below 100°, but such hardening is extremely slow and applicable only to relatively thin layers of material. In closed vessels or molds in which pressure may be used to counteract the tendency of the mass to liberate gases or vapors, as described in my application above referred to, the hardening may be accomplished much more quickly and is more complete, the final product being homogeneous or free from all porosity, insoluble in alcohol, acetone, benzol, phenol or glycerin, or any other known solvent, and less elastic than hard rubber but much harder and considerably more resistant to heat, infusible at all temperatures. The product thus obtained is hereinafter referred to as the "final condensation product."

Under proper conditions there may be produced a condensation product which is intermediate in character between the initial and final products above described, and which is hereinafter referred to as the "intermediate condensation product." This intermediate product is solid at all temperatures, more or less hard when cold, but elastic when slightly heated, and is capable at normal or higher temperatures of yielding to pressure but will resume its original shape if pressure be discontinued; further application of heat will soften it to a considerable extent but will not convert it into a liquid. The product is insoluble in alcohol, glycerin, formalin, or a mixture of the two latter compounds, but swells in phenol and in acetone without complete solution. For convenience I will hereinafter refer to both the initial and intermediate condensation products as "partial reaction products," in contradistinction to the insoluble and infusible mass which constitutes the final condensation product.

For the purposes of the present invention I first obtain either of the partial reaction products, that is to say the initial condensation product or the intermediate condensation product in solid form; this result is readily attained by a sufficiently prolonged heating or by adding the proper proportion of a suitable condensing agent, preferably a base as described in my prior application Ser. No. 397,560. When this point is reached I reduce the material to powder by crushing or grinding. This powder is then introduced into suitable molds and molded in a hydraulic press. Molding is facilitated by applying heat, and it is very advantageous to use temperatures above 100° C., in fact considerably higher temperatures, approaching or exceeding 200° C., give improved results. The use of these high temperatures allows the rapid and complete formation of the final condensation product, which is insoluble and infusible and does not soften or softens only very slightly under application of heat. Or a lower temperature or shorter time of molding may be used, the molded objects being then taken from the mold and transferred to a vessel where they can be heated further under suitable pressure, this procedure having the advantage of a less prolonged use of the mold.

Instead of using the material alone it is often desirable to incorporate with it so-called fillers, as for example inorganic or organic fibrous or cellular materials such as asbestos or wood pulp or other suitable substances which may impart a special color or special properties to the product, or which may cheapen the cost of production or facilitate the act of molding.

The fillers or additional incorporated substances may be added directly to the phenol or the formaldehyde or to any partial reaction product derived from them, and the chemical reaction carried on to such point that the mass has become sufficiently solid to permit subdivision by pulverizing or grinding, care being taken to avoid carrying the reaction to the point where the phenol and formaldehyde are transformed into the final insoluble and infusible condensation product.

The addition of suitable condensing agents, and especially the addition of bases as described in my prior application Ser. No. 397,560, enables me to reach the desired stage of the reaction quickly and surely. After the mass has reached the proper stage it is ground or pulverized, after which it is molded in the hydraulic press as above described.

Molded articles produced by any of the methods above described may be afterward coated by dipping or varnishing with a thin layer of condensation product, which is later transformed into the final condensation product by any of the methods described in my prior applications. This treatment permits the use of compounds containing much filling material and which on this account would otherwise be undesirably porous; the treatment also imparts a gloss to the molded articles. The same result in surfacing the articles can be attained by dusting or coating the walls of the mold with the unmixed powdered partial reaction product or a mixture very rich in the latter product, or by first coating the mold in this manner and afterward with the same product mixed with an appropriate amount of filler, then pressing and treating as usual.

I am fully aware that ground mixtures containing resinous materials have been heretofore used in molding objects. In the present case, however, the problem is entirely novel, because the final condensation product which enters into the constitution of the article is incapable of being welded by any known method to a compact, homogeneous and strong mass. Under the circumstances, it is necessary to bring the initial or the intermediate product of condensation into such a physical state that it can be subdivided and practically employed for rapid and effective mixing and molding; and it is further necessary that during the act of molding or heating the further chemical reaction should occur which transforms the partial reaction product into a final condensation product of maximum toughness, hardness, and physical and chemical inertness. It is necessary to deal not merely with a physical treatment which shapes the compressed body, but with a chemical action which either completes the process of condensation or starts a phenomenon of polymerization which brings about the desired result. To mold in the hydraulic press any of the viscous, pasty or liquid mixtures above described involves considerable trouble and expenditure of time, whereas by means of the method herein described I am able to accomplish the molding in from five to ten minutes; or if the objects be small and the temperature sufficiently high the molding may be completed in two minutes or even less, thus securing great industrial advantages.

By the word "phenol" as used in the claims I intend to include as equivalents the homologues of phenol; and by the word "formaldehyde", I include the polymers of formaldehyde.

I claim:

1. The method of molding articles which consists in comminuting a partial reaction product of phenol and formaldehyde, molding the mass under pressure, and transforming the same into an insoluble and infusible condensation product.

2. The method of molding articles which consists in comminuting a partial reaction product of phenol and formaldehyde, molding the mass under pressure, and transforming the same in the mold into an insoluble and infusible condensation product.

3. The method of molding articles, which consists in preparing a comminuted mixture of a partial reaction product of phenol and formaldehyde and a filling material, molding said mixture, and transforming the partial reaction product into an insoluble and infusible final condensation product.

4. The method of molding articles, which consists in preparing a comminuted mixture of a partial reaction product of phenol and formaldehyde and a filling material, molding said mixture, transforming the partial reaction product into an insoluble and infusible final condensation product, and providing the molded article with a surface layer containing a larger proportion of said final condensation product.

In testimony whereof, I affix my signature in presence of two witnesses.

LEO H. BAEKELAND.

Witnesses:
H. S. TARBELL,
MARY L. SHORT.